(12) United States Patent
Prakah-Asante et al.

(10) Patent No.: US 10,953,875 B2
(45) Date of Patent: Mar. 23, 2021

(54) SYSTEM AND METHOD FOR RAILWAY EN-ROUTE PREDICTION

(71) Applicant: Ford Global Technologies, LLC, Dearborn, MI (US)

(72) Inventors: Kwaku Prakah-Asante, Commerce Township, MI (US); Mark A. Cuddihy, New Boston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 265 days.

(21) Appl. No.: 15/861,276

(22) Filed: Jan. 3, 2018

(65) Prior Publication Data
US 2019/0202452 A1    Jul. 4, 2019

(51) Int. Cl.
*B60W 30/095* (2012.01)
*B60Q 9/00* (2006.01)
*G01C 21/36* (2006.01)

(52) U.S. Cl.
CPC ......... *B60W 30/0956* (2013.01); *B60Q 9/008* (2013.01); *B60W 30/0953* (2013.01); *G01C 21/3629* (2013.01); *G01C 21/3652* (2013.01); *G01C 21/3691* (2013.01)

(58) Field of Classification Search
USPC ........................................................ 701/301
See application file for complete search history.

(56) References Cited

U.S. PATENT DOCUMENTS

| | | | |
|---|---|---|---|
| 9,227,642 B2* | 1/2016 | Huntimer | B61L 25/025 |
| 2017/0001522 A1* | 1/2017 | Mochizuki | G08B 21/06 |
| 2017/0241791 A1* | 8/2017 | Madigan | G06Q 40/08 |
| 2019/0079539 A1* | 3/2019 | Sridhar | G05D 1/0278 |

* cited by examiner

*Primary Examiner* — Maceeh Anwari
(74) *Attorney, Agent, or Firm* — Michael Spenner; Brooks Kushman, P.C.

(57) ABSTRACT

A railway prediction system may include a memory configured to maintain at least one driver profile having driver specific factors, a controller coupled to the memory and programmed to receive route factors indicative of a route and a railway crossing along the route, and instruct an alert in response to the presence of the railway crossing, a threshold according to the driver-specific factors, and an indication of a lack of deceleration of the vehicle.

12 Claims, 3 Drawing Sheets

| | Driver Factors | | | | | |
|---|---|---|---|---|---|---|
| Driver Identifier | Age | Experience | Habits | Preferences | Vehicle Settings | Current Acceleration/ Deceleration |
| 1 | 48 | High | | Sport mode | temp at 68 | |
| 2 | 16 | Low | Fast stop | | radio Sirus at | accelerating, 54 mph |
| 3 | 22 | Medium | | | | |

SYSTEM AND METHOD FOR RAILWAY EN-ROUTE PREDICTION

TECHNICAL FIELD

This disclosure relates to systems and methods for railway en-route prediction.

BACKGROUND

Navigation features and personalized vehicle experiences tailored to specific drivers are being incorporated into vehicles to provide convenience and awareness to users. Vehicle systems may also provide certain information to the users, such as traffic alerts, weather information, and route details.

SUMMARY

A railway prediction system may include a memory configured to maintain at least one driver profile having driver specific factors, a controller coupled to the memory and programmed to receive route factors indicative of a route and a railway crossing along the route, and instruct an alert responsive to presence of the railway crossing, identified per a proximity threshold set according to the driver-specific factors, and an indication of a lack of deceleration of the vehicle.

A railway prediction system may include a memory configured to maintain at least one driver profile having driver specific factors may include a controller coupled to the memory, programmed to trigger an alert invoked based on vehicle presence within a predefined threshold to an upcoming railway crossing along a vehicle route, the threshold set per the driver-specific factors, and issue an alert based on an alert level that increases as vehicle travel time to the crossing decreases.

A method may include receiving route factors indicative of a route and a railway crossing along the route, receiving driver specific factors indicative of driver attributes, issuing an alert in response to the presence of the railway crossing and the driver specific factors indicating a lack of deceleration of the vehicle.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Disclosed herein is a railway awareness system configured to provide driver specific alerts based on driver specific characteristics such as age, experience, acceleration, etc. Upon determining that a railway crossing is along a current driving route, the system may then assign an alert value to the current situation based on a driver type and an activity level and speed of the driver. Depending on the alert value, the system may provide an alert as to the upcoming railway system in order to allow the driver time to adjust his or her driving approach as a result of the upcoming railway.

Figure 1:
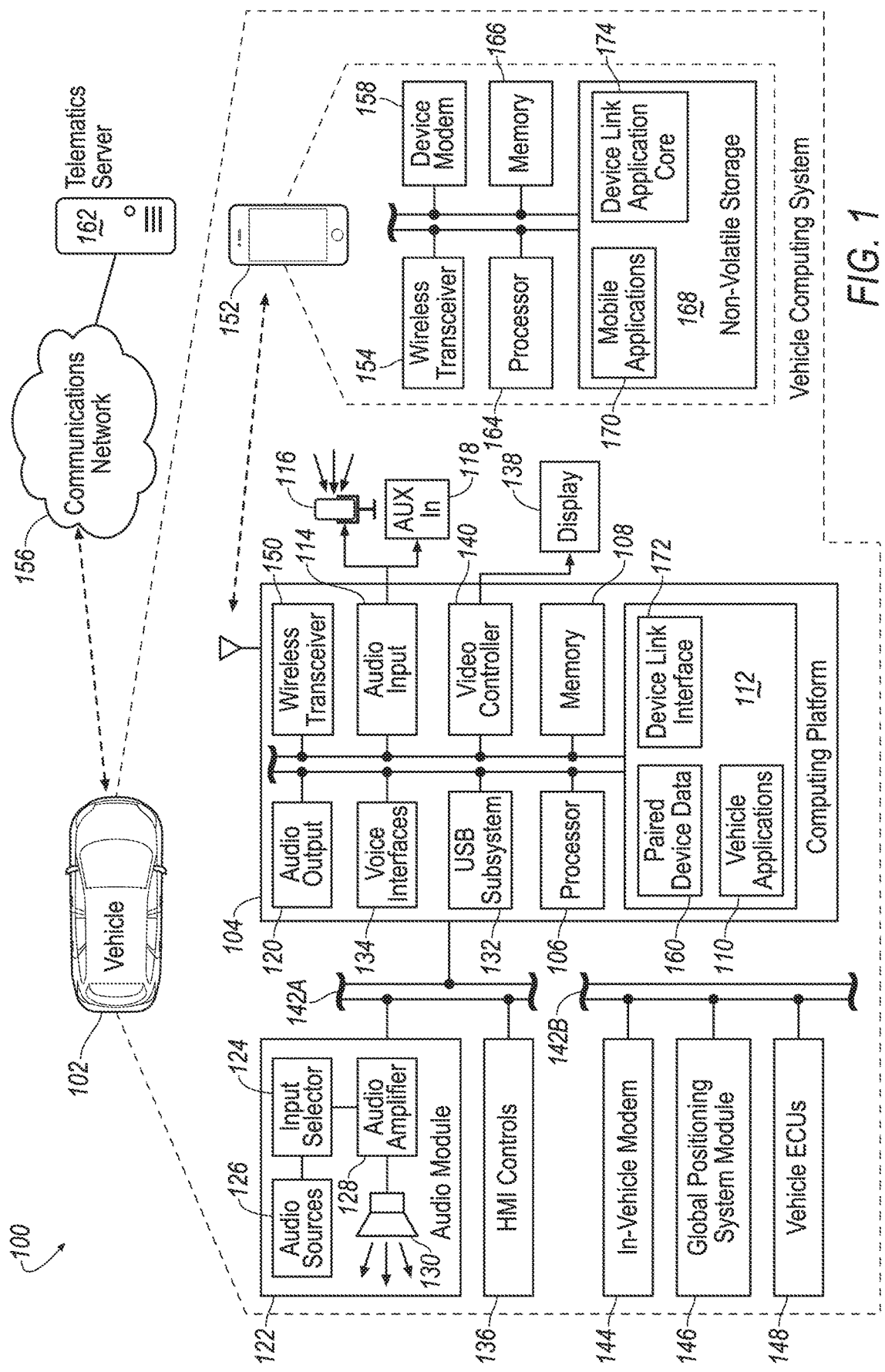
FIG. 1 illustrates an example diagram of a system configured to provide telematics services to a vehicle.

FIG. 1 illustrates an example diagram of a system 100 configured to provide telematics services to a vehicle 102. The vehicle 102 may include various types of passenger vehicles, such as crossover utility vehicle (CUV), sport utility vehicle (SUV), truck, recreational vehicle (RV), boat, plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

The computing platform 104 may include a memory 108 and one or more processors 106 configured to perform instructions, commands and other routines in support of the processes described herein. For instance, the computing platform 104 may be configured to execute instructions of vehicle applications 110 to provide features such as navigation, accident reporting, satellite radio decoding, and hands-free calling. These instructions may include execution of a railway awareness system 200 as described in more detail with respect to FIG. 2 below. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices. The auxiliary audio input 118 may be a physical connection, such as an electrical wire or a fiber optic cable, or a wireless input, such as a BLUETOOTH audio connection. In some examples, the audio input 114 may be configured to provide audio processing capabilities, such as pre-amplification of low-level signals, and conversion of analog inputs into digital data for processing by the processor 106.

The computing platform 104 may also provide one or more audio outputs 120 to an input of an audio module 122 having audio playback functionality. In other examples, the computing platform 104 may provide the audio output to an occupant through use of one or more dedicated speakers (not illustrated). The audio module 122 may include an input selector 124 configured to provide audio content from a selected audio source 126 to an audio amplifier 128 for playback through vehicle speakers 130 or headphones (not illustrated). The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may utilize a voice interface 134 to provide a hands-free interface to the computing platform 104. The voice interface 134 may support speech recognition from audio received via the microphone 116 according to a standard grammar describing available command functions, and voice prompt generation for output via the audio module 122. The voice interface 134 may utilize probabilistic voice recognition techniques using the standard grammar 176 in comparison to the input speech. In many cases, the voice interface 134 may include a standard user profile tuning for use by the voice recognition functions to allow the voice recognition to be tuned to provide good results on average, resulting in positive experiences for the maximum number of initial users. In some cases, the system may be configured to temporarily mute or otherwise override the audio source specified by the input selector 124 when an audio prompt is ready for presentation by the computing platform 104 and another audio source 126 is selected for playback.

The computing platform 104 may also receive input from human-machine interface (HMI) controls 136 configured to provide for occupant interaction with the vehicle 102. For instance, the computing platform 104 may interface with one or more buttons or other HMI controls configured to invoke functions on the computing platform 104 (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as a vehicle modem 144 (which may not be present in some configurations), a global positioning system (GPS) module 146 configured to provide current vehicle 102 location and heading information, and various vehicle ECUs 148 configured to corporate with the computing platform 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

As shown, the audio module 122 and the HMI controls 136 may communicate with the computing platform 104 over a first in-vehicle network 142-A, and the vehicle modem 144, GPS module 146, and vehicle ECUs 148 may communicate with the computing platform 104 over a second in-vehicle network 142-B. In other examples, the computing platform 104 may be connected to more or fewer in-vehicle networks 142. Additionally or alternately, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the computing platform 104. In many examples, the computing platform 104 may include a wireless transceiver 150 (e.g., a BLUETOOTH module, a ZIGBEE transceiver, a Wi-Fi transceiver, an IrDA transceiver, an RFID transceiver, etc.) configured to communicate with a compatible wireless transceiver 154 of the mobile device 152. Additionally or alternately, the computing platform 104 may communicate with the mobile device 152 over a wired connection, such as via a USB connection between the mobile device 152 and the USB subsystem 132. In some examples, the mobile device 152 may be battery powered, while in other cases the mobile device 152 may receive at least a portion of its power from the vehicle 102 via the wired connection.

The communications network 156 may provide communications services, such as packet-switched network services (e.g., Internet access, VoIP communication services), to devices connected to the communications network 156. An example of a communications network 156 may include a cellular telephone network. Mobile devices 152 may provide network connectivity to the communications network 156 via a device modem 158 of the mobile device 152. To facilitate the communications over the communications network 156, mobile devices 152 may be associated with unique device identifiers (e.g., mobile device numbers (MDNs), Internet protocol (IP) addresses, etc.) to identify the communications of the mobile devices 152 over the communications network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, such that the computing platform 104 may automatically be reconnected to the mobile devices 152 referenced in the paired device data 160 without user intervention.

When a mobile device 152 that supports network connectivity is paired with the computing platform 104, the mobile device 152 may allow the computing platform 104 to use the network connectivity of the device modem 158 to communicate over the communications network 156 with the remote telematics server 162 or other remote computing device. In one example, the computing platform 104 may utilize a data-over-voice plan or data plan of the mobile device 152 to communicate information between the computing platform 104 and the communications network 156. Additionally or alternately, the computing platform 104 may utilize the vehicle modem 144 to communicate information between the computing platform 104 and the communications network 156, without use of the communications facilities of the mobile device 152.

Similar to the computing platform 104, the mobile device 152 may include one or more processors 164 configured to execute instructions of mobile applications 170 loaded to a memory 166 of the mobile device 152 from storage medium 168 of the mobile device 152. In some examples, the mobile applications 170 may be configured to communicate with the computing platform 104 via the wireless transceiver 154 and with the remote telematics server 162 or other network services via the device modem 158.

For instance, the computing platform 104 may include a device link interface 172 to facilitate the integration of functionality of the mobile applications 170 configured to communicate with a device link application core 174 executed by the mobile device 152. In some examples, the mobile applications 170 that support communication with the device link interface 172 may statically link to or otherwise incorporate the functionality of the device link application core 174 into the binary of the mobile application 170. In other examples, the mobile applications 170 that support communication with the device link interface 172 may access an application programming interface (API) of a shared or separate device link application core 174 to facilitate communication with the device link interface 172.

The integration of functionality provided by the device link interface may include, as an example, the ability of mobile applications 170 executed by the mobile device 152 to incorporate additional voice commands into the grammar of commands available via the voice interface 134. The device link interface 172 may also provide the mobile applications 170 with access to vehicle information available to the computing platform 104 via the in-vehicle networks 142. An example of a device link interface 172 may be the SYNC APPLINK component of the SYNC system provided by the Ford Motor Company of Dearborn, Mich. Other examples of device link interfaces 172 may include MIRRORLINK, APPLE CARPLAY, and ANDROID AUTO.

Figures 2, 3:
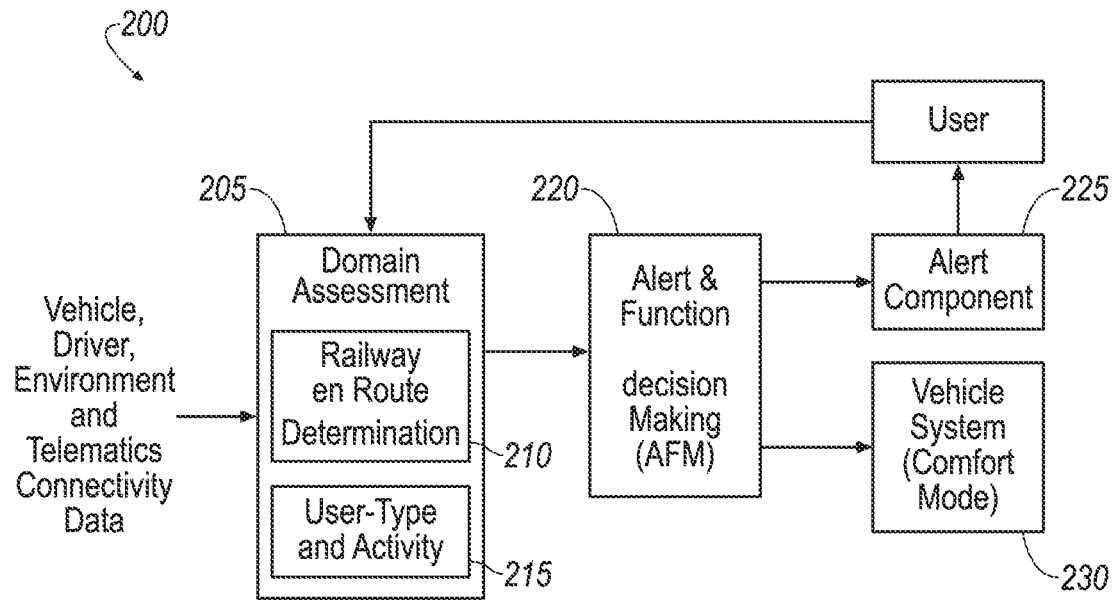
FIG. 2 illustrates an example block diagram of an example railway awareness system.
FIG. 3 illustrates an example database of driver identifiers and associated driver factors.

FIG. 2 illustrates a block diagram for an example railway awareness system 200. As explained above, the railway awareness system 200 may be performed by the processors of the computing platform 104. It should be noted that the illustrated modularization of the railway awareness system 200 is merely an example, and more, fewer, and/or different partitioned railway awareness system 200 components may be used. Additionally or alternatively, the railway awareness system 200 may be maintained on or performed by various cloud based computing sources, a mobile device, a separate module from the computer platform 104, etc.

The railway awareness system 200 may include a domain assessment component 205 configured to receive information from various vehicle components. This information may be indicative of a current driving situation and may include various factors including driver-specific factors as well as route factors. The driver-specific factors may include factors specific to the driver of the vehicle, such as age, experience, driving habits, driving preferences, driver specific vehicle settings such as climate control settings. The driver-specific factors may include static and dynamic factors. The static factors may include factors that are constant for the driver such as the driver's age, experience, etc. The dynamic factors may include factors that change, such as a current driver activity of the driver including the vehicle speed. The driver activity may include an acceleration of the vehicle and the current location of the vehicle along the route relative to the railway crossing. The activity may include whether the vehicle is decelerating.

The driver-specific factors may influence the type of alerts and information that is presented to the user. The driver-specific factors may be maintained in the memory 108. The driver may be identified by various mechanisms, such as via FORD MYKEY, according to specific identification of a key fob, according to the mobile device 152 associated with the driver, etc.

FIG. 3 illustrates an example database 300 of driver identifiers 305 and associated driver-specific factors 310. The driver identifiers 305 may identify various drivers and associate and maintain at least one driver-specific factor 310 associated with each driver. As explained, the driver-specific factors 310 may include the driver's age, experience, driving habits, driving preferences, and driver specific vehicle settings such as climate control settings.

Returning to FIG. 2, the route factors may include route information about the current driving route. The current driving route may be determined by a waypoint entered by the user into the navigation system of the vehicle via the GPS module 146. The current driving route may also be a predicted route based on any number of factors such as previous route history, time of day, type of road, etc. The route factors may contain roadway infrastructure information including railway crossings along the driving route.

The route factors and driver-specific factors 310 may be received by the domain assessment component 205 from various vehicle systems such as the GPS module 146, the vehicle applications 110, the telematics server 162, etc. The domain assessment component 205 may include a Railway Route Determination (RRD) block 210 to determine whether a railway is on the current driving route based on the received route factors. The domain assessment component 205 may also include a User Type and Activity (UTA) block 215 to classify the driver based on the driver-specific factors 310.

The RRD block 210 may determine whether a railway is on the current driving route based on the route information and the location of known railways. The route information, as explained, may be received from the GPS module 146. The route may be determined based on a user inputted endpoint, or a predictive analysis of the driver's historical driving routes. The location of railways may be determined by the same, by other map data received from the cloud, or other external sources. The GPS navigation module 146 and associated map software may indicate the location of infrastructure of interest including roundabouts, railways, places of interest, and available routes. The RRD block 210 obtains signals from the GPS navigation module 146 about approaching railway crossings. The known railways may also be detected by the vehicle using its integrated forward looking camera, using pattern recognition software to detect railroad crossing signs, gates, or other railway crossing indicators and storing this information, along with the GPS coordinates, in its internal memory. This information can be especially useful for providing warnings for frequently crossed intersections where the driver may become complacent about the crossing from frequent repetition.

The UTA block 215 may evaluate and assess the driver-specific factors 310. As explained above, the driver-specific factors 310 may include specific driver attributes such as be a driver's age, driving history or capability. The UTA block 215 may determine a driver type and a user activity. The driver type may classify the user based on at least one driver-specific factor 310 such as the driver's age. As explained above, the driver factors may also dynamic factors that include the current activity of the driver including the vehicle speed. The driver activity may include the acceleration of the vehicle and the current location of the vehicle along the route relative to the railway crossing. The activity may include whether the vehicle is decelerating.

The railway prediction system 200 may also include an Alert and Function Decision-Making (AFM) block 220. The AFM block 220 applies certain decision rules to determine whether to provide an alert or activate a vehicle system setting (e.g., suspension setting for comfort mode). This may include assigning an alert value to the driving situation and assigning an alert based on that value. For example, a general rule may be that if there is a railway on the route, if the time to the railway is less than a predefined amount of time, and if the user is below a certain age or driving experience level, then a certain level of alert will be provided. The level of alert may depend on the time to railway crossing, and may include various audible and visual alerts.

Generally, this decision rule may be modeled such as:

If (RRD is $x_i$, and $t$ is $\leq y_i$, and UTA is $z_i$), then AFM output=$m_i$     (Eq. 1)

where:
$x_1$=1 for railway on route, and 0 for railway not on route;
time to railway, t=time until vehicle will cross or meet the railway in seconds;
$y_i$=predefined amount of time, such as 3 seconds;
UTA, $z_i$=1 for vehicle speed is decreasing or decelerating and vehicle speed being less than β, where β=a predefined vehicle speed, for example, 50 MPH, and, $z_i$=0 for vehicle speed not decreasing;
AFM alert value, $m_i$=0 for no action,
$m_i$=1 for vehicle system comfort mode selection, and
$m_i$=2 for driver alert issuance.

The railway prediction system 200 may include an alert component block 225. The alert component block 225 may provide a mechanism for alerting the driver as to an upcoming railway crossing. The system 200 may automatically provide alerts customized to the user when the AFM 220 determines that a railway is upcoming. The alert may be provided in the form of audible mechanisms via, for example, the speaker 130, or via visual mechanisms such as the display 138. The alerts may be graduated alerts having various levels of alerts. In one example, the alerts may have three levels of increasing severity, e.g., low, medium, or high. The graduated alerts may be determined by the processor 106 based on the time to railway crossing and the UTA 205 at the AFM 220. The level of alert may dictate the type or form of the alert. For example, a high level of alert may cause an audible alert having a higher volume than that of a medium level alert. A low level of alert may have a lower light intensity at the user interface than that of a medium level of alert, in another example.

The time to railway factor t may determine a threshold by which to evaluate driver behavior such as vehicle speed. The level of alert may be based on certain timing thresholds. For example, the processor 106 may determine a low level of alert if the time to railway is less than a first timing threshold T1 and greater than a second timing threshold T2. The processor 106 may determine a medium level of alert if the time to railway is less than the second timing threshold T2 and greater than a third timing threshold T3. The processor 106 may determine a high level of alert if the time to railway is less than the third timing threshold T3.

The tunable timing thresholds T1, T2, and T3 may be adjusted based on the driver-specific factor. For example, the timing thresholds may be lower if the driver is below a certain predefined age threshold or level of driving experience, or has a certain driving habit (e.g., lack of deceleration). Further, as explained above, if the dynamic factor indicates that the vehicle is slowing down (i.e., decelerating), then the processor 106 may select not to issue the alert. An example threshold chart is illustrated below:

| Driver Age or Experience Level | T1 | T2 | T3 |
|---|---|---|---|
| ≤21 years or low experience level | 6 seconds | 5 seconds | 4 seconds |
| >21 years or medium to high experience level | 5 seconds | 4 seconds | 3 seconds |

The processor 106 may provide the alert as long as the timing thresholds are met. The level of alert may change if the time to railways changes. That is, if a user is approaching a railway and the vehicle is not decelerating, an alert may graduate from a medium level of alert to a high level of alert.

The customized graduated alert may be depicted as:

$$\text{alert} = \begin{cases} \text{low,} & \text{if } T1 \leq T_{RW} \leq T2 \\ \text{medium,} & \text{if } T3 \leq T_{RW} \leq T2 \\ \text{high,} & \text{if } T_{RW} \leq T3 \end{cases}$$

In one example and as illustrated in the above chart, T1 may be 5 seconds, T2 may be 4 seconds, and T3 may be 3 seconds. However, in the event that UTA block 220 indicates a young novice driver, such as a driver 21 years old or younger, then the timing thresholds may be increased so that warnings may be issued sooner. In this example, T1 may be 6 seconds, T2 may be 5 seconds, and T3 may be 4 seconds.

The railway prediction system 200 may include a vehicle system component 230. The vehicle system component 230 may enable, disable, or switch a vehicle setting relating to the driving performance of the vehicle or road conditions. For example, a signal may be sent to the vehicle system component 230 to make adjustments to the vehicle suspension system to compensate for the irregularities in the road surface due to the railroad crossing by adjusting the suspension (making it "softer") and/or the steering wheel, or making other adjustments to improve the feel/handling of the vehicle at the railroad crossing. When a railway crossing is predicted en-route by the RRD 210, the AFM 220 may automatically engage a vehicle system comfort mode for enhanced ride for the driver just before crossing the railway. The ARM sends a signal to reset the vehicle system component 230 to the original mode after the railway crossing. Optionally, the vehicle may decelerate automatically if it detects that the vehicle speed is still above the β threshold from Eq. 1, and the time $\ll y_i$ (for example, 2 seconds).

Figure 4:
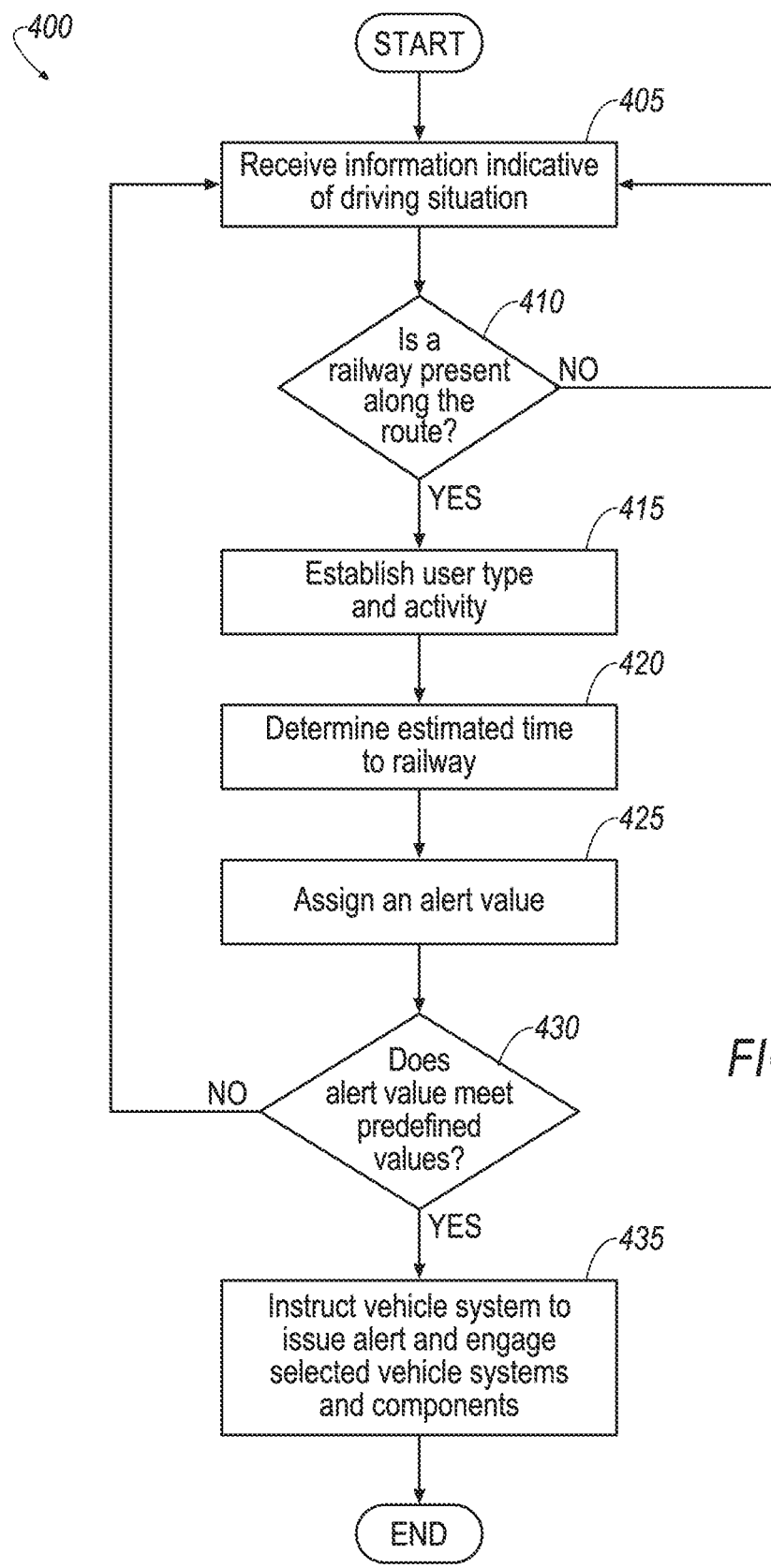
FIG. 4 illustrates an example process for the railway awareness system.

FIG. 4 illustrates an example process 400 for the railway awareness system 200. The process 400 begins at block 405 where the domain assessment component 205 receives information from the various vehicle systems, as described above. The information may be indicative of the current driving situation made up of a various driving factors, including route factors and driver factors.

At block 410, the processor 106 may determine whether a railway is present along the current route. This may be done at the RRD block 210 of the domain assessment component 205. The processor 106 may determine whether a railway is present along the route based on the route information and the location of known railways from the navigation GPS 146 and map database. If the processor 106 determines that a railway is present along the route, then the process 300 proceeds to block 415. If not, the process 400 returns to block 405.

At block 415, the processor 106 determines the user type and activity at the UTA block 215. As explained, the UTA block 215 may assess the driver factors, including the driver attributes and driver activity. For example, the UTA block 215 may establish that the driver is a novice with low experience or 16 years old (i.e., the user type) and traveling at a speed of 50 MPH (i.e., the activity). The driver activity may also include the acceleration of the vehicle and the current location of the vehicle.

At block 420, the processor 106 may determine the estimated time to the railway t. This may be determined based on the current speed of the vehicle and the current location of the vehicle relative to the railway crossing as defined by the driving route.

At block 425, the processor 106 may assign the alert value at the AFM block 220. The alert value, as explained above, may be based at least in part on the driver factors and route factors, specifically the time to railway t, user type, and activity. Certain driving situations may lead to an alert or engage a vehicle system setting, while others may not.

At block 430, the processor 106 may determine whether the value provided by the AFM block 220 meets a predefined value and thus indicating that an alert as to the upcoming railway crossing is appropriate. In one example, the predefined value may be a non-zero value. That is, in the example values provided above, does the AFM alert value have a value of 1 or 2. If so, the process 400 proceeds to block 435. If not, the process 400 returns to block 405.

At block 435, the processor 106 may instruct the relevant vehicle system to provide the alert and to engage a vehicle system (e.g., vehicle suspension system for comfort mode). The alert may be visual, audible, haptic, etc. The vehicle may escalate the alert as the time to railway crossing decreases and compensatory action is not provided by the driver. The alert may also cease as soon as certain conditions are met (e.g., the vehicle slows down, etc.).

The process 400 may then end.

Accordingly, disclosed herein is railway prediction system that customizes alerts of an upcoming railway crossing based on driver factors and route factors. The driver factors allow alerts to be issued based on driver attributes such as age, speed of travel, driving history, etc. Younger drivers, or drivers that are not slowing down as the vehicle approaches the railway may be alerted to the railway either via haptic, visual, and/or audible mechanisms.

Computing devices described herein, such as the computing platform 104, mobile device 152, and telematics server 162, generally include computer-executable instructions where the instructions may be executable by one or more computing devices such as those listed above. Computer-executable instructions, such as those of the virtual network interface application 202 or virtual network mobile application 208, may be compiled or interpreted from computer programs created using a variety of programming languages and/or technologies, including, without limitation, and either alone or in combination, Java™, C, C++, C#, Visual Basic, JavaScript, Python, JavaScript, Perl, PL/SQL, Prolog, LISP, Corelet, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A railway prediction system, comprising:
 a memory configured to maintain at least one driver profile having driver-specific factors; and
 a controller coupled to the memory, programmed to
  receive route factors indicative of a route and a railway crossing along the route;
  instruct activation of a vehicle system suspension setting in response to the route factors indicating travel time to the railway being below a predefined time threshold; and
  instruct an alert in response to the driver-specific factors indicating an age of the driver being below a predefined age threshold, wherein the alert includes an audible alert configured to escalate in volume as travel time to the railway decreases and in response to the controller failing to receive an indication of deceleration of the vehicle.

2. The system of claim 1, wherein the time threshold is defined based on the driver-specific factors.

3. The system of claim 1, wherein the controller is further programmed to instruct an alert in response to the controller failing to receive an indication of a lack of deceleration of the vehicle within a predefined time threshold.

4. The system of claim 1, wherein the controller is further programmed to instruct an alert to cease in response to the controller receiving an indication of deceleration of the vehicle.

5. A railway prediction system, comprising:
 a memory configured to maintain at least one driver profile having driver-specific factors; and
 a controller coupled to the memory, programmed to
  trigger an alert invoked based on vehicle presence within a predefined threshold to an upcoming railway crossing along a vehicle route, the threshold set per the driver-specific factors,
  issuing a vehicle system suspension setting in response to route factors indicating a time to the railway being below a predefined time threshold, and
  issuing an alert based on an alert level that increases as vehicle time to the crossing decreasing, wherein the predefined threshold is a timing threshold defined by the driver-specific factors, and the alert level further increases based on an indication of lack of deceleration of the vehicle, wherein the alert includes an audible alert configured to escalate in volume as the alert level increases.

6. The system of claim 5, wherein the alert level increases based on driver experience as indicated by the driver-specific factors.

7. The system of claim 5, wherein the alert level increases as a time to the railway decreases.

8. The system of claim 5, wherein the alert level indicates a type of alert.

9. The system of claim 5, wherein the alert decreases based on an indication of deceleration of the vehicle.

10. A method, comprising:
 receiving route factors indicative of a route and a railway crossing along the route;
 receiving driver-specific factors indicative of driver attributes;
 issuing an alert in response to the presence of the railway crossing, a threshold defined according to the driver-specific factors, and an indication of a lack of deceleration of the vehicle;
 issuing a vehicle system suspension setting in response to the route factors indicating a time to the railway being below a predefined time threshold; and
 instructing the alert to escalate in response to a failure to receive an indication of a further lack of deceleration of the vehicle within a predefined time threshold.

11. The method of claim 10, further comprising issuing the alert in response to the driver-specific factors indicating an experience level of the driver.

12. The method of claim 10, further comprising instructing the alert to escalate in response to a failure to receive the indication of a further lack of deceleration of the vehicle within a predefined time threshold.

* * * * *